United States Patent
Li et al.

(10) Patent No.: US 11,875,426 B2
(45) Date of Patent: Jan. 16, 2024

(54) GRAPH SAMPLING AND RANDOM WALK ACCELERATION METHOD AND SYSTEM ON GPU

(71) Applicant: SHANGHAI JIAO TONG UNIVERSITY, Shanghai (CN)

(72) Inventors: Chao Li, Shanghai (CN); Pengyu Wang, Shanghai (CN); Jing Wang, Shanghai (CN); Haojin Zhu, Shanghai (CN); Minyi Guo, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 113 days.

(21) Appl. No.: 17/661,663

(22) Filed: May 2, 2022

(65) Prior Publication Data
US 2022/0309609 A1   Sep. 29, 2022

Related U.S. Application Data

(63) Continuation of application No. PCT/CN2021/084847, filed on Apr. 1, 2021.

(51) Int. Cl.
*G06T 1/20* (2006.01)
*G06F 9/50* (2006.01)
*G06F 9/48* (2006.01)

(52) U.S. Cl.
CPC .............. *G06T 1/20* (2013.01); *G06F 9/4881* (2013.01); *G06F 9/5027* (2013.01)

(58) Field of Classification Search
CPC .... G06F 9/4806; G06F 9/4881; G06F 9/3009; G06F 9/3888; G06F 2209/5018
See application file for complete search history.

(56) References Cited

U.S. PATENT DOCUMENTS

2022/0309609 A1*   9/2022   Li ............................ G06T 1/20

FOREIGN PATENT DOCUMENTS

| CN | 112925627 A | * | 6/2021 | ........... G06F 9/4881 |
| CN | 111950594 B | * | 5/2023 | ........... G06K 9/6223 |

* cited by examiner

*Primary Examiner* — Todd Buttram
(74) *Attorney, Agent, or Firm* — CBM PATENT CONSULTING, LLC

(57) ABSTRACT

A graph sampling and random walk acceleration method and system based on GPU. The graph data is read from the storage medium through the CPU and converted into CSR format and then output to the GPU. The GPU works based on the defined working mode: Real-time generation of alias table and sampling; or offline judgment whether there is a pre-generated alias table and sampling, which executes the alias method efficiently and in parallel, and can significantly improve the performance of graph data processing on the same hardware platform, including improving the sampling throughput and reducing the overall running time.

9 Claims, 3 Drawing Sheets

GRAPH SAMPLING AND RANDOM WALK ACCELERATION METHOD AND SYSTEM ON GPU

CROSS REFERENCES

Figure 1:
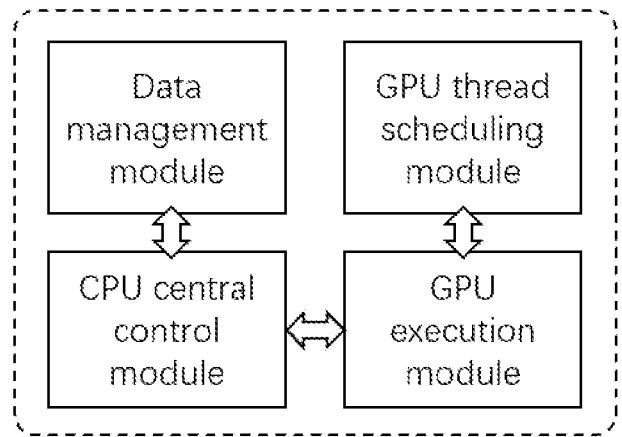

This application is a continuation application of PCT/CN2021/084847 filed on Apr. 1, 2021 that claims priority to Chinese Patent Application Ser. No. 202110318094.7 filed on 25 Mar. 2021.

TECHNICAL FIELD

This patent relates to a technology in the field of data processing, specifically a method and system for accelerating graph sampling and random walk on GPU processors.

BACKGROUND

Graph sampling and random walk select subgraphs of the original graph by certain criteria. Graph sampling and random walk are commonly used when processing graph data, which can significantly reduce the overhead of processing large graphs while preserving a high accuracy rate for artificial intelligence (AI) applications. However, the procedure of graph sampling and random walk is time-consuming. Accelerating graph sampling and random walk are of great significance for the overall performance improvement.

Biased (or weighted) graph sampling and random walk refer to a method of randomly selecting neighbor vertices based on the weight of the edges connected to the certain vertex in the graph. Biased graph sampling and random walk usually need to calculate the transition probability of neighbor vertices to ensure randomness. The alias method is a method for calculating transition probability. However, it is generally considered to be difficult to parallelize the alias method efficiently, thus there are no prior works that use GPU to accelerate the alias method.

Patent Content

Existing biased graph sampling methods have many disadvantages. To overcome their high computing complexity, low execution efficiency, and long overall runtime, we propose a graph sampling and random walk acceleration method and system on GPUs. With our system, the alias method can be executed efficiently with the massive parallelism of GPUs. The performance of graph data processing can be significantly improved on the same hardware platform, in terms of sampling throughput improvement and overall running time reduction.

This patent is achieved through the following technical solutions

This patent proposes an efficient graph sampling and random walk system on GPUs. The graph data is read from storage through CPUs and converted into a compressed sparse row (CSR) format and output to GPU. This method can work in two modes, the online mode and the offline mode. In online mode, the alias table, a data structure storing the information for the alias method, for targeted vertices is generated and used for sampling on GPU. In offline mode, it can generate the alias table for all the vertices (if there aren't any) and then leverage the generated alias table for sampling.

The sampling task on one vertex requires constructing its alias table and selecting neighbors. The central processing unit initiates the kernel function to execute on the GPU, whose threads continuously participate in the variable-size thread workgroups during their life cycle to process the tasks in the task queue.

Threads continuously participating in the thread work group of variable-size means that the sampling tasks are stored in the global task queue, and threads in the thread block continuously process the tasks in the task queue. According to the different states of the thread block, threads participate in a sub-warp, warp or thread block to coordinate sampling, respectively.

The different states of the thread block include sub-warp coordination, warp coordination, and thread block coordination.

The sampling procedure leverages a load balancing strategy that allocates sampling tasks to thread groups of different sizes according to the degree of the vertices to be sampled. The details are as follows. The vertices are classified according to the size and threshold of the vertices in the out-degree array, and then are processed by thread sub-warps, thread warps, or thread blocks, respectively.

The vertex classification includes three cases: ① If the out-of-degree of the vertex to be sampled is d and $d<T_1$, then the node uses a thread sub-warp for processing. ② If $T_1<d<T_2$, the node uses a warp for processing. ② If $T_2<d$, then the node uses a thread block for processing.

The thread sub-warp usually includes 4 or 8 threads. The warp includes 32 threads usually. and the thread block is usually 256, 512, or 1024 threads in size.

The specified warp processing threshold is less than the thread block processing threshold.

The present invention relates to a system for implementing the above method, including a CPU main control module, a data management module, a GPU execution module, and a GPU scheduling module. Among them, the data management module is connected to the CPU main control module and manages data movement according to control instructions. The CPU main control module is connected to the GPU execution module and transmits task execution information. The GPU scheduling module is connected to the GPU execution module and transmits scheduling information.

This patent considers such a problem that existing systems for graph sampling and random walk are inefficient and time-consuming. This results in execution stalls and severe hardware underutilization. As an important stage of the graph representation learning pipeline, graph sampling and random walk algorithms consume 31% and 82% of the time as discussed in the literature. Slow graph sampling and random walk make graph neural network applications prohibitive in latency-critical scenarios such as today's various Artificial Intelligence of Things (AIoT) devices.

Technical Effect

This patent integrally solves the disadvantages of the prior arts such as low parallelism, low execution efficiency, and long overall runtime. Compared with the prior arts, we have high execution performance, load-balanced execution scheduling strategy, and support for online and offline workloads.

Our method shows significant speedup for common graph sampling and random walk acceleration techniques compared with the existing methods. It can accelerate a wide range of applications based on graph neural networks and graph representation learning algorithms. Specifically, the method and apparatus can greatly reduce the end-to-end latency of graph neural network training and inference process. In the past, the execution time of graph sampling and random walk requires several seconds to finish; in contrast, our system can generate the results within 1 millisecond. As a result, the invention potentially enables real-time drone control, high-performance autonomous car, and efficient operation of intelligent wearable devices, etc.

DESCRIPTION OF THE ATTACHED FIGURES

Figure 2:
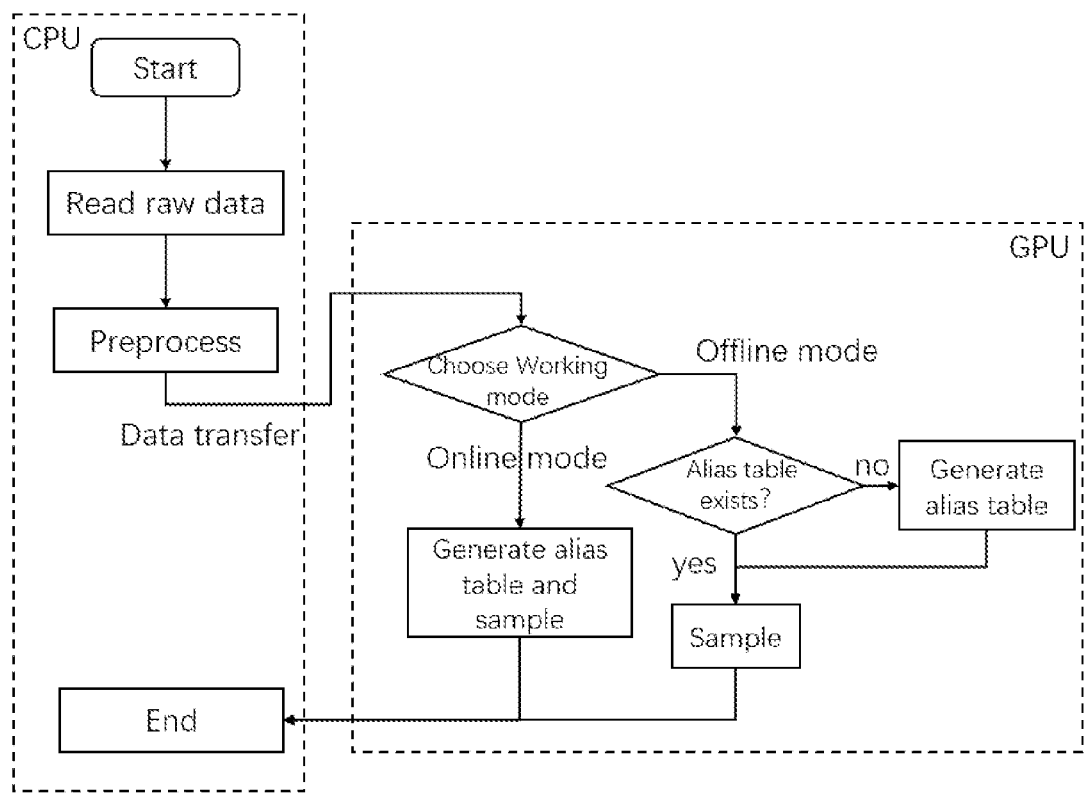
Figure 3:
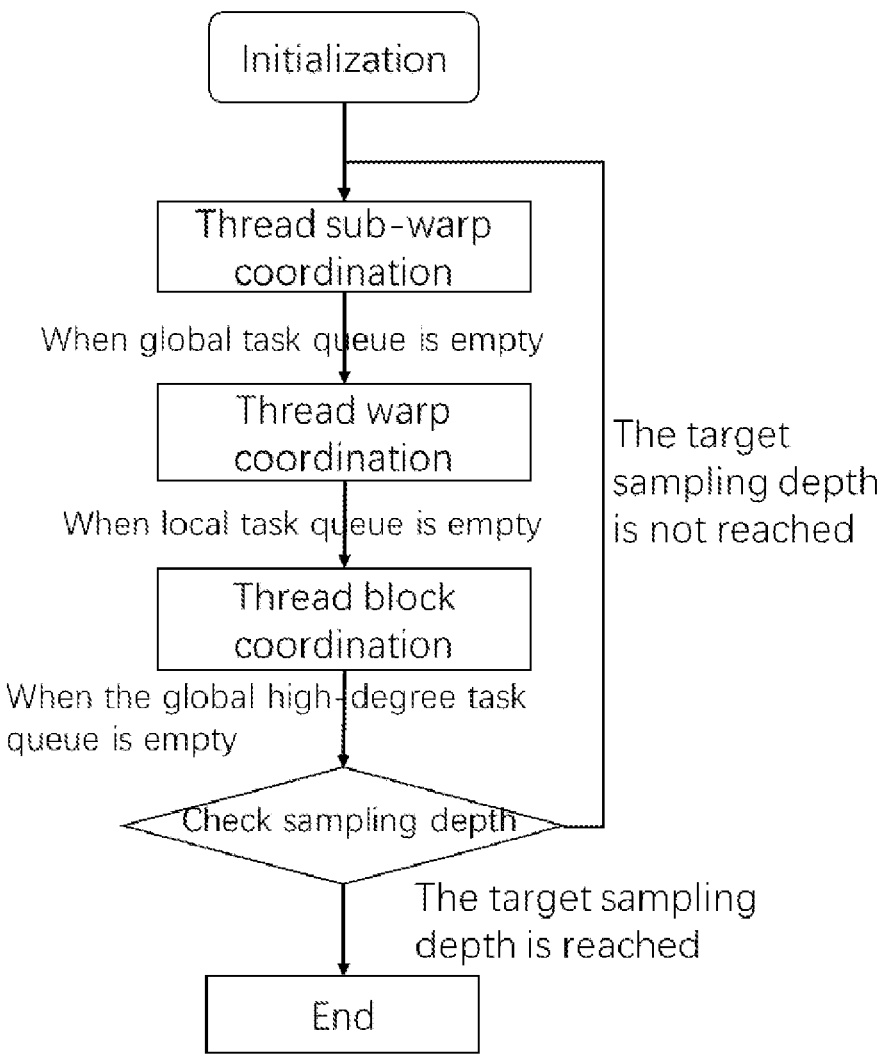
Figure 4:
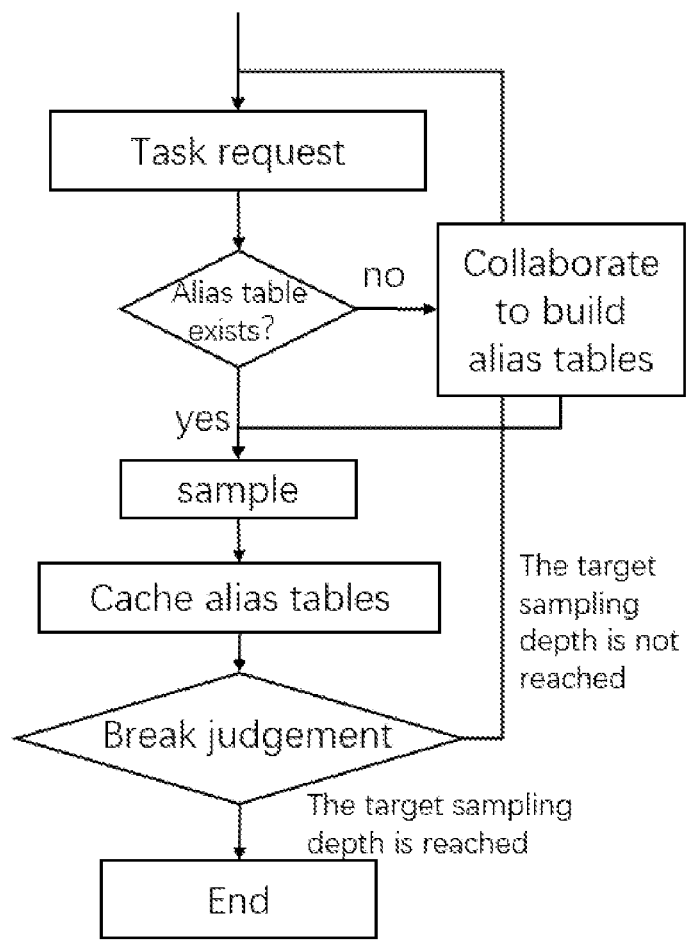

FIG. 1 is a diagram of the system structure of this patent;
FIG. 2 is a flowchart of the patent;
FIG. 3 is a schematic diagram of GPU iteration execution;
FIG. 4 is a schematic diagram of sampling of task groups of different sizes in online working mode.

DETAILED DESCRIPTION

As shown in FIG. 2, this embodiment relates to a graph sampling and random walk acceleration method based on GPU. The graph data is read from a storage medium by the CPU and converted into the CSR format and then output to the GPU. The GPU works based on the defined working mode: the online mode when generating of alias table on demand and sampling; or the offline mode when leveraging pre-generated alias table and sampling, where: in the initial stage, the graph structure data is stored in the GPU memory, and the vertices to be processed are stored in the global task queue in the GPU memory; in the iterative execution stage, thread groups of the kernel function process tasks in the global task queue independently until the global task queue is empty.

The offline mode refers to: generate the alias table for the full graph when there is no pre-generated alias table, otherwise use the existing alias table for sampling.

Generating an alias table for the full graph includes:

Step 1.1: The thread block of each GPU function requests a task from the global task queue. When the number of vertices to be sampled in the task is obtained and $d<T_1$, the threads in this thread block perform collaborative processing on the vertices, that is, multiple threads at the same time, calculate the alias table for a vertex together; when $T_1<d<T_2$, the vertex is temporarily added to the local task queue for subsequent processing; when $T_2<d$, the vertex is added to the global height vertex task Queue, where $T_1$ and $T_2$ are two adjustable thresholds, which are 32 and 256 in practice; d is the out-degree of the vertex, that is, the number of edges emitted by the vertex.

The global task queue is generated by the main control CPU thread at the initial stage and contains D subtask queues, where D is the sampling depth, and each sub-queue contains a vertex to be processed. The queue with a sampling depth of 0 is initialized as the Root vertex of this sampling task.

The degree of the vertex to be processed is higher than the adjustable threshold $T_2$.

In the iterative process, the kernel function can add tasks to the subtask queues.

The local task queue is generated and maintained by each thread block, and it stores the vertices obtained by the thread sub-bundles that meet the requirements of $T_1<d<T_2$.

The thread sub-warp refers to a collection of multiple adjacent GPU threads at runtime, and the size is usually 4, 8 or 16.

Step 1.2: When the global task queue corresponding to this iteration is empty, the completed thread in a warp waits for other threads in the same warp to participate in the processing of the local task queue.

Step 1.3: When the local task queue corresponding to the current iteration is empty, the completed thread in one thread block waits for other threads in the same thread block to participate in the processing of the global high-degree vertex task queue.

Step 1.4: Judge the sampling depth by each warp and check whether the current sampling depth is equal to the target sampling depth. When the sampling does not reach the target depth, repeat steps 1.1-1.4 for iteration, otherwise, the processing ends.

As shown in FIG. 4, the real-time generation and sampling of an alias table specifically include:

Step 2.1: The working group of each GPU core function requests a task from the corresponding task queue and obtains a vertex to be sampled.

Step 2.2: Each working group checks the GPU's memory. If there is an alias table for the vertices to be sampled, go directly to the next step, otherwise, multiple GPU threads will coordinate to construct an alias table for the vertices to be sampled at the same time.

Step 2.3: Each working group uses min(|WG|, k) threads for sampling, where: min represents the minimum value, |WG| represents the number of threads in the working group, and k represents the size of each point sampled at the current depth.

Step 2.4: Each working group stores the constructed alias table in the memory of the GPU for future use.

After specific practical experiments, on a test server platform equipped with two 2.40 GHz Intel Xeon 6148 CPUs, 256 GB of memory, and one NVIDIA RTX 2080Ti GPU, with $T_1=8$, $T_2=256$, thread sub-warp size as 4, thread warp size as 256, and thread block size of 256, run the above method. On the Arabic-2005 dataset, the throughput of sampling in the real-time and offline working modes are 536 and 2545 million edges per second, respectively, in real-time and offline mode. The throughputs of random walks in this working mode are 65 and 3399 million edges per second, respectively. Compared with the CPU-based KnightKing system, the throughput of real-time and offline random walks is increased by 499 and 33 times; Compared with the GPU-based C-SAW system, the throughput of real-time and offline sampling is increased by 83 and 65 times, and the throughput real-time and offline random walks is increased by 18 and 13 times.

Compared with the prior arts, this method makes full use of the massive parallelism of the GPU, ensures load balancing, and reduces runtime overhead.

Our method shows significant speedup for common graph sampling and random walk acceleration techniques compared with the existing methods. It can accelerate a wide range of applications based on graph neural networks and graph representation learning algorithms. Specifically, the method and apparatus can greatly reduce the end-to-end latency of graph neural network training and inference process. In the past, the execution time of graph sampling and random walk requires several seconds to finish; in contrast, our system can generate the results within 1 millisecond. As a result, the invention potentially enables real-time drone control, high-performance autonomous car, and efficient operation of intelligent wearable devices, etc.

The foregoing specific implementations can be locally adjusted by those skilled in the area in different ways without departing from the principle and purpose of the present invention. The protection scope of the present invention is subject to the claims and is not limited by the foregoing specific implementations. All implementation schemes within the scope are bound by the present invention.

What is claimed is:

1. A graph sampling and random walk acceleration method based on GPU, which is characterized in that the graph data is read from the storage medium through the CPU and converted into CSR format and then output to the GPU; the GPU works according to the set working mode: the online mode when generating of alias table on demand and sampling; or the offline mode when leveraging the pre-generated alias table and sampling, the said central processing unit initiates a kernel function executed on the GPU, and the thread blocks of the kernel function continuously participate in a variable-size thread work group during its life cycle to process tasks in the task queue and implement random walk execution model; the said offline mode refers to: when there is no pre-generated alias table, the alias table is generated for the full graph before sampling, otherwise, the existing alias table is used for sampling; and the graph sampling and random walk acceleration enabling real-time drone control, high-performance autonomous car, and efficient operation of intelligent wearable devices.

2. The graph sampling and random walk acceleration method based on GPU according to claim 1, wherein the thread continuously participating in a variable-size thread work group refers to: the sampling tasks are stored in global task queue, the threads in the thread block continuously process the tasks in the task queue; according to the different states of the thread block, the threads among them participate in the thread sub-warp, thread warp or thread block to perform sampling collectively.

3. The graph sampling and random walk acceleration method based on GPU according to claim 2, characterized in that the different states of the thread block include: thread sub-warp coordination, warp coordination, and thread block coordination.

4. The graph sampling and random walk acceleration method based on GPU according to claim 1, characterized in that, the sampling mentioned, allocates the vertices to be processed to GPU thread groups of different sizes according to the degree of the vertices to be sampled; the load balancing strategy of the processor thread group is implemented as follows: classify the vertices according to the out-degree size and threshold value of the vertices in the out-degree array, and then use the sub-warp, wrap or block to process the vertices respectively.

5. The graph sampling and random walk acceleration method based on GPU according to claim 4, wherein the vertex classification includes: i) when $d<T_1$ where k represents the out-degree of the vertices to be sampled, the vertex is processed by a thread sub-bundle; ii) when $T_1<d<T_2$, the vertex is processed by a warp; and iii) when $T_2<d$, the vertex is processed by a thread block; among them, the out-degree of a vertex is the number d of edges in the directed graph that point to other vertices, and two thresholds $T_1$ and $T_2$.

6. The GPU-based graph sampling and random walk acceleration method according to claim 5, wherein the global task queue is used to instruct the GPU kernel function threads to switch between three states: thread sub-warp coordination, warp coordination, and thread block coordination without having to invoke the kernel function multiple times.

7. The graph sampling and random walk acceleration method based on a GPU according to claim 1, wherein said generating an alias table for a full graph specifically includes:
    step 1: the thread block of each GPU core function requests a task from the global task queue; when the number of vertices to be sampled in the task is obtained and $d<T_1$, the threads in one sub-warp perform collaborative processing on the vertices, that is, multiple threads at the same time, calculate the alias table for a vertex together; when $T_1<d<T_2$, the vertex is temporarily added to the local task queue for subsequent processing; when $T_2<d$, the vertex is added to the global height vertex task Queue, where $T_1$ and $T_2$ are two adjustable thresholds, which are 32 and 256 in practice; d is the out-degree of the vertex, that is, the number of edges emitted by the vertex;
    step 2: when the global task queue corresponding to this iteration is empty, the completed thread in a warp waits for other threads in the same warp to participate in the processing of the local task queue;
    step 3: when the local task queue corresponding to the current iteration is empty, the completed thread in one thread block waits for other threads in the same thread block to participate in the processing of the global high-degree vertex task queue; and
    step 4: each thread checks whether the current sampling depth is equal to the target sampling depth; when the sampling does not reach the target depth, repeat steps 1-4 for iteration, otherwise the processing ends.

8. The graph sampling and random walk acceleration method based on GPU according to claim 1, wherein said generating and sampling an alias table in real-time specifically includes:
    step 1: the working group of each GPU kernel function requests a task from the corresponding task queue and obtains a vertex to be sampled;
    step 2: each working group checks the GPU's memory; if there is an alias table for the vertices to be sampled, go directly to the next step, otherwise, multiple GPU threads will coordinate to construct an alias table for the vertices to be sampled at the same time;
    step 3: each working group uses min(|WG|, k) threads for sampling, where: min represents the minimum value, |WG| represents the number of threads in the working group, and k represents the size of each point sampled at the current depth; and
    step 4: each working group stores the constructed alias table in the memory of the GPU for future use.

9. A system implementing the method according to claim 1, characterized in that it comprises: a CPU main control module, a data management module, a GPU execution module, and a GPU scheduling module, wherein: the data management module is connected to the CPU main control module and manage data movement according to control instructions, the CPU main control module is connected to the GPU execution module and transmits task execution information, and the GPU scheduling module is connected to the GPU execution module and transmits scheduling information.

* * * * *